United States Patent [19]

Steinbruegge et al.

[11] 4,430,697

[45] Feb. 7, 1984

[54] METHOD AND APPARATUS FOR STARTING A PARALLEL-TUNED CURRENT FED INVERTER

[75] Inventors: Harold A. Steinbruegge; Chuck F. Der, both of Sykesville, Md.

[73] Assignee: Westinghouse Electric Corp., Pittsburgh, Pa.

[21] Appl. No.: 359,550

[22] Filed: Mar. 18, 1982

[51] Int. Cl.³ ........................................... H02M 5/458
[52] U.S. Cl. ..................................... 363/49; 219/10.75
[58] Field of Search .......................... 219/10.75, 10.77; 363/37, 49, 136

[56] References Cited

U.S. PATENT DOCUMENTS

| | | | |
|---|---|---|---|
| 3,506,907 | 4/1970 | Porterfield et al. | 363/49 |
| 3,599,078 | 8/1971 | Pelly et al. | |
| 3,757,197 | 9/1973 | Bailey | 363/49 |
| 4,086,622 | 4/1978 | Vukasovic | 363/49 X |

OTHER PUBLICATIONS

Knapp; P., "Characteristics of the Parallel-Resonance Inverter for Inductive Melting," Brown-Boveri Review, Oct. 1966.

Primary Examiner—William M. Shoop
Attorney, Agent, or Firm—C. M. Lorin

[57] ABSTRACT

A high frequency current-fed inverter of the series/parallel compensated type is started directly with the main thyristors of the inverter by charging the series capacitor through the input inductor of the DC supply during a first time interval with one pole, by discharging the same during a second time interval with the other pole, then passing to free-running operation at an initial frequency from which load operation can begin. The first and second time intervals are established while a constant DC voltage is being applied so that commutation of the outgoing thyristor is insured. DC voltage regulation is eliminated as soon as the free-running operation has been initiated.

6 Claims, 4 Drawing Figures

METHOD AND APPARATUS FOR STARTING A PARALLEL-TUNED CURRENT FED INVERTER

BACKGROUND OF THE INVENTION

The present invention relates to high-frequency inverters in general, and more particularly to the technique of starting a high-frequency inverter, typically for induction heating applications.

An induction heating apparatus basically includes a thyristor-controlled bridge rectifier for converting the industrial AC power supply (typically 440 V, 3-phase 60 Hz) to a controllable DC voltage which is in turn applied to a thyristor inverter generating high frequency AC power to a work coil tuned with a capacitor.

For induction heating applications, the work coil load itself is predominantly inductive, with loaded Q-factors in the range between 2.0 and 20. Thus, it is necessary to "tune out" the inductive kVA of the work coil with a capacitor in order to enable the inverter to operate at, or near to, unity power factor. The compensating capacitor is connected in parallel across the load, while the load includes a parallel-tuned load at a slightly higher frequency than the resonant frequency of the load. The inverter is of the current-fed type, e.g., developing an essentially square wave current into the parallel-tuned load. Therefore, the load phase angle, as seen by the inverter, is always slightly leading and the output current leads the output voltage by an angle which is sufficient to ensure that, in the course of successive gating of the thryistors of the inverter, the load voltage commutates the current from one pair of thyristors to the other, before reversing its polarity.

Due to the relatively high Q-factor of the work coil, the parallel-tuned load circuit is necessarily underdamped, e.g., oscillatory. This leads to the square wave of current generating a sinusoidal voltage across the load.

As generally known with the current-fed inverter, the square wave of current at the output is "forced" by the presence of a relatively large smoothing inductance on the side of the DC link voltage. This inductor also insures that the input current has only a relatively small superposed AC ripple component.

A serious disadvantage with a current-fed inverter for energizing a parallel-tuned load is the difficulty of starting the inverter. Before the thyristors of the inverter can be cycled safely for successive gating and commutating at the required frequency of the load, first the line inductor should have received from the rectifier power supply sufficient current flow, and the parallel-tuned load should have enough energy available for commutation of the thyristors initially.

As explained in U.S. Pat. No. 3,599,078 of Brian R. Pelly, auxiliary means have been proposed, such as a parallel-tuned inverter controlled at a lower frequency which is charged, then, discharged into the load to provide initial energy at start-up. However, the starting techniques have not been satisfactory when, as in induction heating, the main inverter is required to operate over a wide frequency range to accommodate a wide range of loads. Difficulty also arises which is due to the stray capacitance associated with the leads connecting the tuned load to the inverter, especially at high frequency of operation. Alternate techniques to the one disclosed in the aforementioned Pelly patent, which have been used previously to start the inverter with its parallel-tuned load, have been to (1) initially disconnect the output tuning capacitor from the inductance coil; (2) to precharge the inductance coil with a precharging current which is then diverted through the inverter into the tuned load circuit to shock the load into oscillation. For reasons explained in the Pelly patent, these prior art approaches are not satisfactory.

The "parallel compensated" inverter circuit for induction heating applications is required to operate in a high frequency range, typically up to 9.6 kHz. At such high frequency, the starting circuit becomes critical, especially when phased out into the free-running operation of the inverter, since the main thyristors must be able to be safely commutated by that time. Accordingly, it has been proposed to modify the circuit by adding a capacitor in series with the load for starting, then to disconnect the capacitor once the inverter is running. As a further development, it has been conceived that if such capacitor could be left permanently in circuit, the auxiliary start-circuit could be advantageously simplified. This is especially a warranted conclusion, since the series capacitor actually makes a useful contribution in the normal operation of the induction heating apparatus by correcting the overall load phase angle, as viewed by the inverter, towards a desirable leading phase angle. Accordingly, the parallel capacitive compensation required for the load can be reduced. In other words, the presence of a series capacitor enables the parallel compensated load to operate at a better power factor than otherwise would be the case. Moreover, with a transformer-coupled load, as commonly used in order to provide isolation from the workpiece side, the presence of such series capacitor is of a definite practical advantage by reducing the required kVa rating of the output transformer.

It is also observed that, when rated power is being delivered to the load with the series capacitor, namely with a "series/parallel compensated" output circuit, there is no limiting minimum critical value of output load impedance, and the inverter is capable of supplying the full rated output current, at any level of output voltages. See: P. Knapp, "Characteristics of the Parallel-Resonance Inverter for Inductive Melting," Brown-Boveri Review, October, 1966.

SUMMARY OF THE INVENTION

The invention resides in method and apparatus for starting a current-fed inverter of the series/parallel compensated type. The inverter is, according to the present invention, allowed through complementary thyristors of one pole of the inverter to progressively receive current from its DC power supply through the front smoothing inductance until such time ($t_1$) that a predetermined voltage has been established on the series-capacitor of the load compensated circuit; at which time the complementary thyristors of the inverter associated with the other pole are triggered into conduction; and the series-capacitor is allowed thereafter, until some time ($t_2$) as is sufficient, to build up another predetermined voltage for which the complementary thyristors of the opposite pole can be triggered again into conduction; free-running control of the inverter being allowed to be started thereafter within a half-period of operation thereof.

DESCRIPTION OF THE PREFERRED EMBODIMENT

The present invention stems from the realization that for all practical purposes an induction heating apparatus should include a sizable inductance in circuit with the input from the DC power supply to the current-fed inverter and also a sizable capacitor in series in the diagonal of the inverter. These could advantageously be used to start the inverter, rather than using auxiliary starting elements which have to be inserted then taken out, an approach of the prior art which is costly, which involves some complexity and which may affect reliability.

Figure 1:
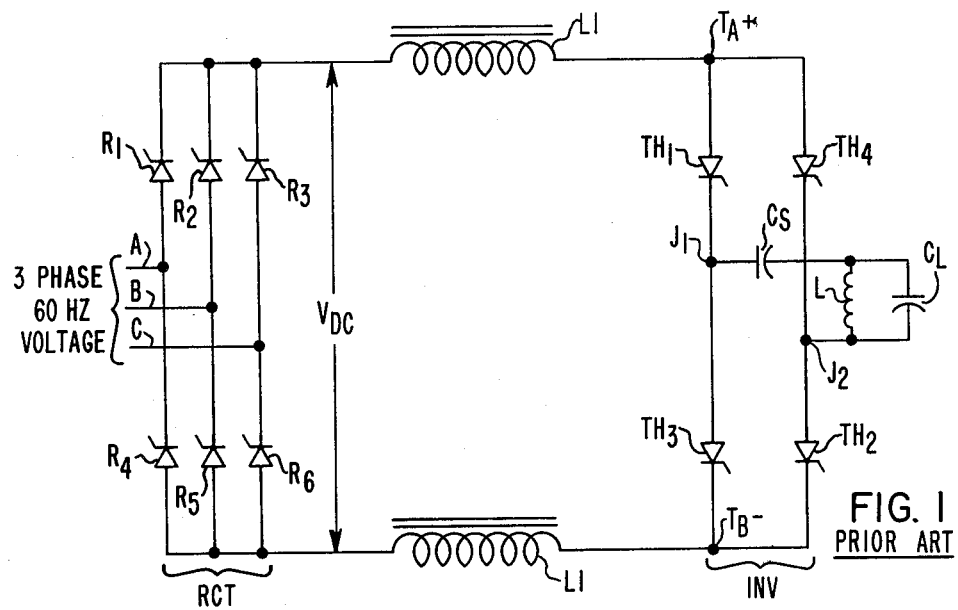
FIG. 1 shows a series/parallel compensated load circuit connected in the diagonal of a thyristor-controlled inverter as known in the prior art.

Referring to FIG. 1, the three-phase 60 Hz AC power supply is converted by a six-rectifier bridge RCT ($R_1$-$R_6$) into a DC voltage $V_{DC}$ applied to the terminals TA+, TB−, of an inverter bridge INV, through a smoothing inductance $L_1$ (shown distributed equally between the two polarity terminals). Inverter INV, which is of the current-fed type and which is intended to be operated at high frequency, typically up to 9.6 kHz, is illustrated as including four thyristors $TH_1$-$TH_4$, where $TH_1$, $TH_4$ are connected to the positive terminal TA and $TH_2$, $TH_3$ are connected to the negative terminal $T_B$. In the diagonal of the inverter, namely between common junction $J_1$ (to $TH_1$, $TH_3$) and common junction $J_2$ (to $TH_4$, $TH_2$) is connected a series capacitor Cs and a parallel inductance-capacitance circuit (L,CL) which illustrates and represents in simplified form the load of the induction heating apparatus. In other words, load inductance L in fact includes, or does not include, the working piece which is treated by the high frequency field generated by working coil L.

When the apparatus is OFF, rectifiers $R_1$-$R_6$ are non-conducting, voltage $V_{DC}$ is nil and inverters $TH_1$-$TH_4$ are also non-conducting. It is common practice to start the inverter by first progressively allowing $V_{DC}$ to build up across the inductance $L_1$ once rectifiers $R_1$-$R_6$, which are thyristors, have been fired into conduction. As explained by reference to FIG. 3, a voltage regulator (not zshown in FIG. 1) is provided so that when rectifier unit RCT is started, the voltage $V_{DC}$ applied to inductor L, builds up and stabilizes as a constant-voltage before any step is taken for starting the inverter. In contrast to the prior art, at this stage, no initial starting step is taken which would consist in storing energy either in a separate starting circuit, or in the inductance $L_1$, which stored energy would be at a subsequent stage discharged abruptly into the main capacitance-inductance network in the diagonal of the inverter.

Figure 2:
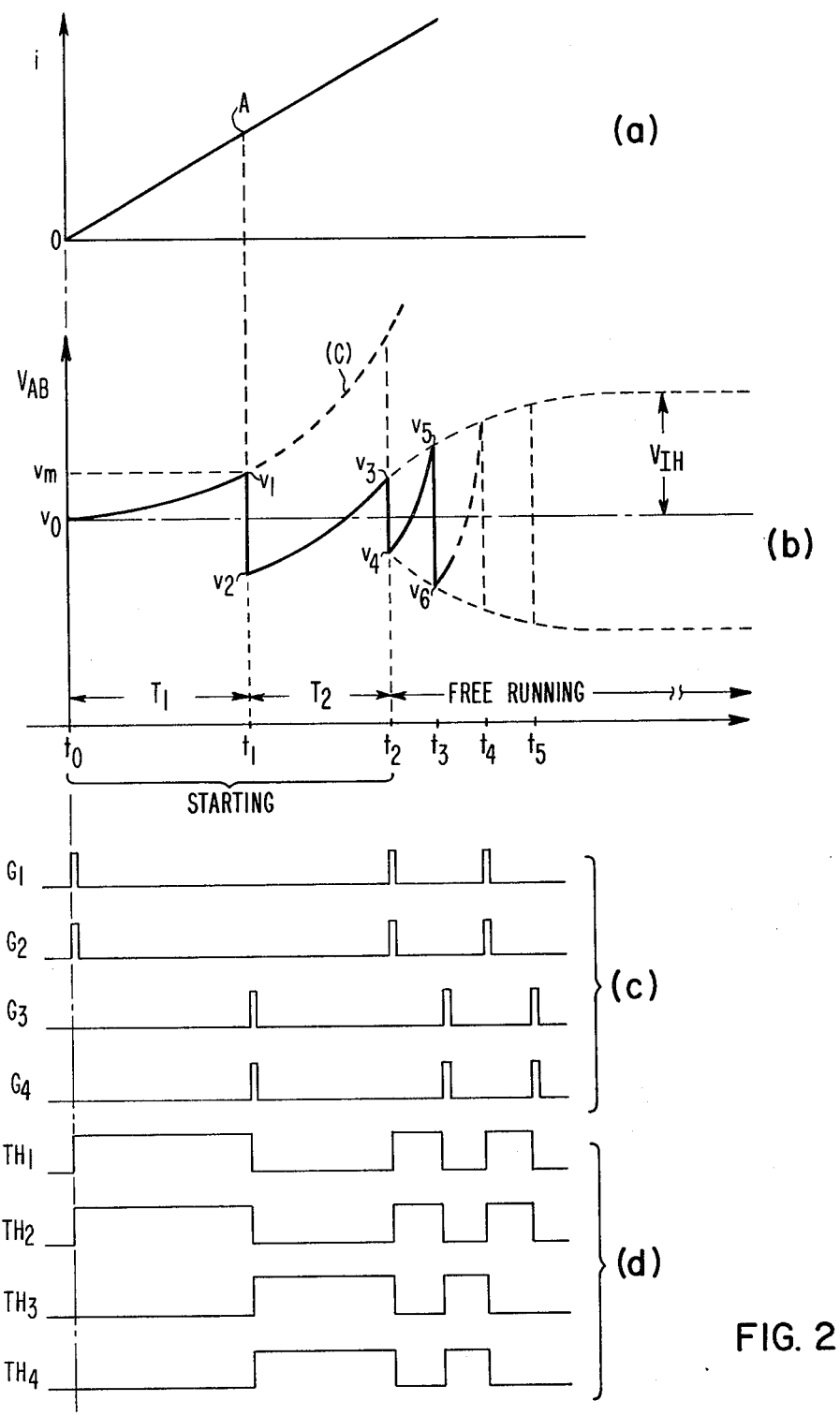
FIG. 2 shows with curves the method of starting the inverter of FIG. 1, according to the present invention.

Rather, according to the present invention, by firing the main thyristor of the inverter right from the start, the series capacitor Cs is allowed to be charged directly under the constant voltage $V_{DC}$ from the DC power supply, while current is being allowed to flow continuously through the smoothing inductor $L_1$ and to build up progressively. Referring to FIG. 2, the current i flowing from the DC power supply into the ($L_1$-Cs) series inductor-capacitor network is i, increasing in magnitude substantially linearly (as shown by curve (a) of FIG. 2) since $V_{DC}=L_1(di/dt)$ and charging of $L_1$ is under constant voltage $V_{DC}$. At this time, the parallel load ($C_L$-L) does not come into the picture in practice. In other words, the series inductor-capacitor circuit formed by the inductance $L_1$ and capacitor Cs is used to start the inverter. This is due to the fact that under such starting condition the inverter is operated at a frequency which is substantially different from the operative resonant frequency of the parallel inductance-load when the apparatus is performing induction heating. Therefore, the parallel inductor-capacitor ($L_1$, $C_L$) circuit of the load during the start does not substantially affect the operation of the series capacitor-inductor circuit ($L_1$, Cs). To be precise, for a starting frequency of charging and discharging Cs, which is selected to be 3.45 kHz, at the upper end of the induction heating frequency range for an operative range down to 2.1 kHz, the parallel load is inductive but of value L which is substantially smaller than $L_1$, which for a starting frequency at the upper end of the induction heating frequency range, the parallel load appears to be capacitive, nevertheless with a value $C_L$ which is small compared with Cs. It will be explained, hereinafter, how the timing for charging and discharging Cs is selected in order to meet such starting requirement.

Referring to FIG. 2, at time $t_0$ thyristors $TH_1$, $TH_2$ are turned ON by firing pulses $G_1$, $G_2$. It is understood that the inverter would as well be started with the two other complementary thyristors $TH_3$, $TH_4$. As a result, capacitor Cs is initially charged through inductor $L_1$ from positive pole TA+ to negative pole TB−, e.g., under the constant voltage $V_{DC}$. Capacitor Cs receives a voltage $$V_{Cs} = \frac{1}{Cs} \int i\,dt$$

which is exponential since current i increases linearly. Curve (a) shows current i, curve (b) shows the voltage applied to capacitor Cs. As generally known, given enough time, voltage $V_{Cs}$ would eventually reach $2 \times V_{DC}$. However, conduction of $TH_1$, $TH_2$ is not allowed to continue beyond a duration $T_1$. It is observed that for some time during $T_1$ the magnitude of $V_{Cs}$ remains very low. According to the present invention, $T_1$ is chosen to be of sufficient duration that a minimum voltage $V_M$ is reached which corresponds to the safe commutation voltage of the thyristors. At such time $T_1$, the other complementary thyristors, $TH_3$, $TH_4$ in this instance, are fired (by pulses $G_3$, $G_4$ of curve (c)), and thyristors $TH_1$, $TH_2$ are turned OFF. When thyristors $TH_3$, $TH_4$ are ON, the polarity terminals TA, TB become connected to the opposite plates of capacitor Cs which starts discharging during the time interval $T_2$ that they are ON. Immediately, voltage $v_1$ applied when $TH_1$, $TH_2$ were conductive, becomes voltage $v_2$ of the opposite polarity as shown by curve (b) after switching instant $t_1$. Since voltage $v_m$ is defined as the minimum commutation voltage of $TH_1$, $TH_2$, these thyristors are effectively turned OFF. Beyond instant $t_1$, the voltage on capacitor Cs increases following a translated portion of curve (c) from $v_2$ to $v_3$. $TH_3$ and $TH_4$ are kept ON during a second time interval $T_2$. Again, the voltage $v_3$ reached at time $t_2$ which, when $TH_1$, $TH_2$ are again fired by pulses $G_1$, $G_2$, is sufficient to commutate thyristors $TH_3$, $TH_4$. Since the exponential curve has become much sharper than in the preceding time interval, voltage $v_3$ is reached in less time than $v_1$. It is not necessary to let $v_1$ increase too much above the satisfactory level of commutation. Assuming $V_{DC}=200$ volts and $C_s=65$ $\mu$F with $L_1=10$ milliHenry, a value of $T_1=270$ $\mu$s will be sufficient to reach a minimum level of $v_m=50$ volts. At time $t_2$ when switching occurs, $V_{Cs}$ passes from $v_3$ (positive) to $v_4$ (negative) as $TH_3$, $TH_4$ are cut OFF. From $t_2$ to $t_3$, in accordance with curve (c), the voltage $V_{Cs}$ increases sharply to $v_5$. According to the present invention, while instants $t_1$ and $t_2$ are determined by $T_1$ and $T_2$ so as to achieve commutation voltages $v_1$ and $v_5$, beyond time $t_2$ the system is assumed to be in condition for normal operation, e.g., for starting cyclical operation of the inverter at the free-running operation, namely at the initial frequency chosen as stated above to 3.45 kHz. At this frequency, the parallel-tuned load becomes significant and combines its effect with the series capacitor $C_s$. As shown by curve (b) of FIG. 2 at instants $t_3$, $t_4$, $t_5$. The voltages $(v_3-v_4)$, $(v_5-v_6)$ become further apart until the load operation takes place, in accordance with induction heating, under peak values $V_{IH}$ also depending upon the frequency of operation, namely downward from kHz toward 2.1 kHz. Under the illustration given of $L_1=10$ milliHenry, $C_s=65$ $\mu$F and $V_{DC}=200$ volts, the inverter is capable of providing 200 amperes under 300 volts, e.g., 60 kVA, the peak voltage varying between 56 and 420 volts.

Moreover, the thyristors which have been fired at the start (for instance $TH_1$ and $TH_2$) require a commutation voltage assumed to be at least 50. This is the predetermined voltage $v_m$ which should have been reached at time $t_2$ when the other pair of thyristors is fired (thus, $TH_3$, $TH_4$). Accordingly, time interval $T_1$ should be sufficient to allow curve (c) to reach that level $v_m$ at $v_1$. A practical value of $T_1$ in the illustration given is 270 $\mu$sec. Similarly, the numerical values given hereabove lead to a second time interval $T_2=205$ $\mu$sec. At time $t_2$, the main timer is triggered. Therefore, the successive time intervals become equal to 145 $\mu$sec each, on account of the starting of free-running switching rate of 3.45 kHz. $v_3$ and $v_4$ are of the order of 25 volts, where $v_1$ and $v_2$ are of the order of 50 volts.

FIG. 2 also shows the occurrence of gating pulses $G_1$ and $G_2$ at time $t_0$ for $TH_1$ and $TH_2$, of gating pulses $G_3$ and $G_4$ at time $t_1$ for thyristors $TH_3$, $TH_4$, and the subsequent alternate pairs of pulses $(G_1, G_2)$, $(G_3, G_4)$ at times $t_2$, $t_3$, $t_4$, $t_5$, etc. The ON and OFF conditions are indicated on FIG. 2 in line with the corresponding thyistors $TH_1$-$TH_4$ (curve (d)).

Figure 3:
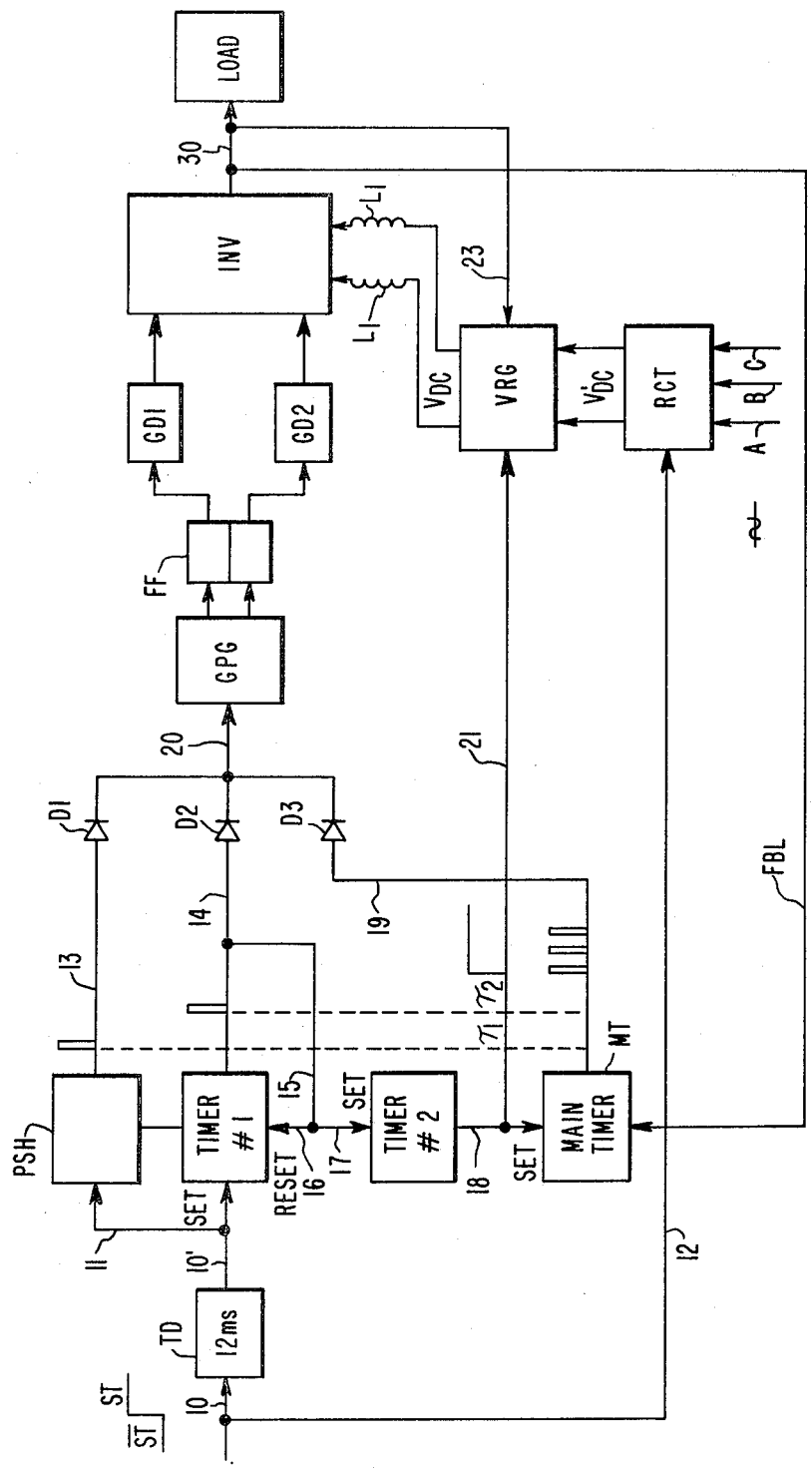
FIG. 3 is a block diagram of the starting apparatus according to the present invention.

Referring to FIG. 3, the control system according to the present invention is schematically shown in block diagram. It is observed that in FIG. 1 the voltage $V_{DC}$ was assumed to be constant. This is not the case, however, at the output of the rectifiers, because the three-phase AC voltage is essentially variable and must vary with the loading conditions. Accordingly, as shown in FIG. 3, after the rectifier unit RCT producing a DC voltage $V_{DC}'$, a voltage regulator VRG is temporarily interposed so that a constant voltage $V_{DC}$ be applied during the start-up, to the series capacitor-inductor $C_s$-$L_1$. In the example given, $V_{DC}$ is regulated at 200 volts. The regulated voltage $V_{DC}$ is applied to the inductor $L_1$ and, from then on, to the inverter INV which includes the series/parallel compensated load. The thyristors are controlled in the conventional way by pairs from a gate pulse generator GPG through a flip-flop FF gating the pulses either to the gate driver $GD_1$ for one pair of thyristors $(TH_1, TH_2)$, or to the gate driver $GD_2$ for the other pair $(TH_3, TH_4)$.

When the control system is to be started, a signal ST is applied on line 10, for instance, by pressing a pushbutton. As a result by line 12 the rectifier unit RCT is triggered and voltage regulator VRG which has been enabled previously by line 23 will establish on inductor $L_1$ a constant voltage $V_{DC}$. The starting signal which logically passes from $\overline{ST}$ to ST, sets from line 10 a timer TD of say 12 millisecond. Past this delay, namely at time $t_0$, signal ST is applied via line 11 to a pulse shaper PSH and via line 10' it sets a first timer, Timer #1, of say $T_1=270$ microseconds. The pulse shaper (which may be a monostable multivibrator) immediately generates on line 13 a triggering pulse which, via diode $D_1$ and line 20, causes the gate pulse generator GPG of the inverter thyristors to trigger in accordance with flip-flop FF one of the opposite gate drive circuits $GD_1$ (for $TH_1$, $TH_2$), $GD_2$ (for $TH_3$, $TH_4$). It is assumed like in FIG. 2, that the initial pulse $G_1$, $G_2$ at time $t_1$ is for $TH_1$, $TH_2$.

After a time interval $T_1$ following $t_0$, and established by Timer #1, a pulse is outputted on line 14 therefrom and applied via diode $D_2$ onto line 20 into the GPG circuit. Accordingly, flip-flop FF is now switched over toward gate drive $GD_2$ and the other pair $(TH_3, TH_4)$ is fired, thus, at time $t_1$. At the same time, by lines 15 and 16, Timer #1 resets itself and the outputted pulse triggers the second timer (Timer #2) by lines 15 and 17. After a time interval $T_2$ established by Timer #2, a pulse is generated on line 18 which triggers the main timer MT. Also, via line 21, such triggering pulse causes the voltage regulator VRG to be disabled. At this time, (from instant $t_2$ on) the inverter becomes actuated by the main timer at the free-running switching rate applied by line 19 via diode $D_3$ and line 20 to the GPG circuit.

At this time the inverter has been started and normal feedback regulation via line $FB_L$ takes place, adjusting the frequency of the voltage-controlled oscillator within the main timer MT to the load condition at the output of the inverter on lines 30. When the apparatus is stopped, the voltage regulator VRG is enabled again by line 23, thereby preparing for another start-up condition on line 10 at the input side of the starter system.

Figure 4:
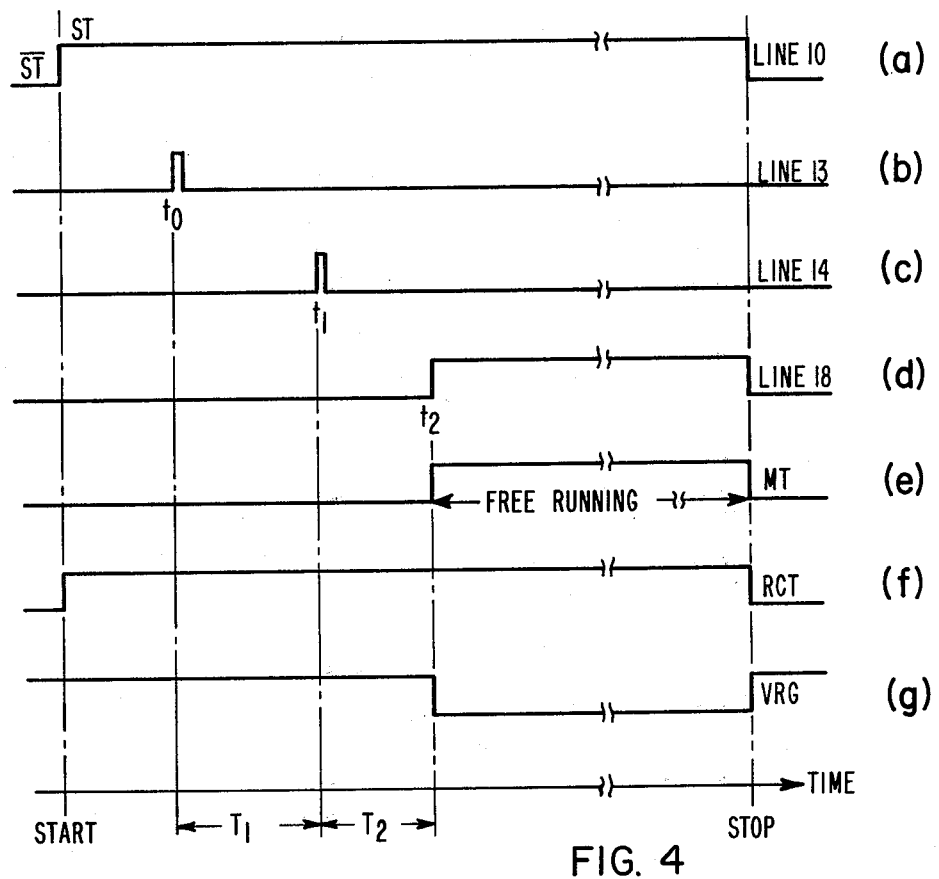
FIG. 4 shows with curves the timing of operation of several structural blocks of the apparatus of FIG. 3.

Referring to FIG. 4, curve (a) is the start signal ST of line 10; curve (b) is the thyristor triggering pulse of line 13 at time $t_0$; curve (c) is the thyristor triggering pulse of line 14 at time $t_1$; curve (d) is the logic signal of line 18 at time $t_2$; curve (e) shows the ON logic state of the main timer MT when free-running pulses are emitted on line 19; curve (f) shows the ON and OFF states of the rectifier unit RCT and curve (g) shows the ON and OFF states of the voltage regulator VRG.

Although the invention has been disclosed in the context of induction heating apparatus, it is understood that it is applicable more generally to starting of a high frequency inverter of the current-fed type and of the series/parallel compensated load category.

All the blocks shown on FIG. 3 are recognized as conventional circuits, preferably using solid state devices. For instance, the pulse shaper PSH can be a monostable multivibrator including a solid state device providing a 12 $\mu$sec pulse. Timers #1 and #2 each have a solid state device establishing the desired delay (270 microsec. and 205 microsec. respectively, in the example given). The main timer MT includes a voltage-controlled oscillator allowing within the desired operative range provided by a voltage-controlled reference a free-running frequency of 3.45 kHz at the start, and a wide range of frequencies within the Q response imposed by the load.

It has been demonstrated that the inverter starting apparatus according to the present invention can be applied to an inverter operative in a frequency range up to 10 kHz.

We claim:

1. A method of starting a high frequency (HF) thyristor-controlled inverter having a capacitor in series with a parallel compensated load under a DC voltage applied through an inductor element, comprising the steps of:
    applying said DC voltage to said inductor element and said series capacitor by firing complementary thyristors of one pole of said inverter to conduct during a first time interval sufficient to establish a first predetermined minimum voltage across said series-capacitor, said first minimum voltage being sufficient to commutate said complementary thyristors of one pole;
    firing complementary thyristors of the other pole of said inverter at the end of said first time interval to conduct during a second predetermined time interval sufficient to establish a second predetermined minimum voltage across said series-capacitor, said second minimum voltage being sufficient to commutate said complementary thyristors of the other pole; and
    firing said thyristors of said inverter from at least the end of said second time interval in alternate succession at a predetermined free-running frequency of said HF inverter with increasing participation of said parallel compensated load.

2. The method of claim 1 with said DC voltage being maintained constant during said first and second time intervals.

3. Apparatus for starting a thyristor-controlled high frequency (HF) inverter supplied with DC voltage through an inductor element and having a capacitor in series with a parallel compensated load, comprising:
    first means initiated at an initial instant for firing complementary thyristors associated with one pole of said inverter;
    second means initiated after a first predetermined time interval from said initial instant for firing complementary thyristors associated with the other pole of said inverter;
    third means initiated after a second predetermined time interval immediately following said first time interval for firing said complementary thyristor associated with one pole of said inverter; and
    timing means responsive to initiation of said third means for alternately forming said other and said one pole complementary thyristors as a predetermined initial switching rate of operation for said inverter.

4. The apparatus of claim 3 with said first and second predetermined time intervals each being of a duration sufficient to insure commutation of a conducting thyristor.

5. The apparatus of claim 3 with said DC voltage being provided by a direct current voltage link through voltage regulator means operative to provide a constant DC voltage, said voltage regulator means being enabled before said initial instant, and being disabled at least at the end of said second predetermined time interval.

6. The apparatus of claim 5 with means for controlling said timing means to regulate the switching rate of operation of said inverter as a function of the load, said controlling means being operative after at least the end of said second predetermined time interval.

* * * * *